Dec. 30, 1958 C. E. ZUMWALT 2,866,276
CORE DEVICE FOR TEACHING ELECTRICITY AND MAGNETISM
Filed Aug. 12, 1957 6 Sheets-Sheet 1

INVENTOR.
C. E. Zumwalt
BY
Webster + Webster
ATTYS

Dec. 30, 1958   C. E. ZUMWALT   2,866,276
CORE DEVICE FOR TEACHING ELECTRICITY AND MAGNETISM
Filed Aug. 12, 1957   6 Sheets-Sheet 2
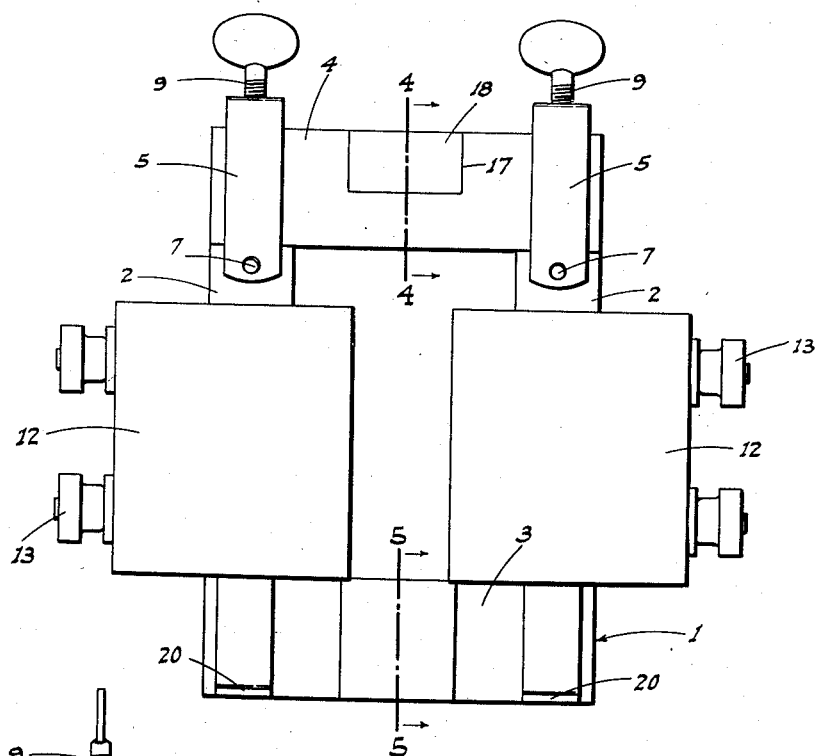
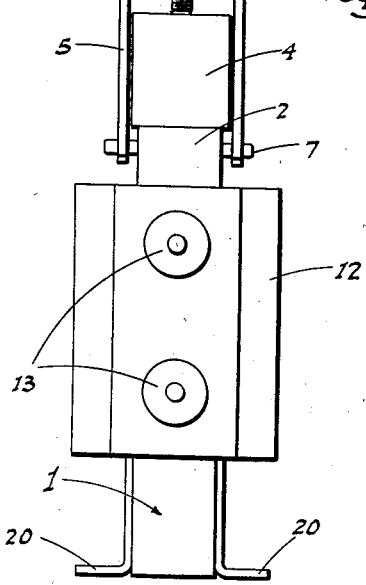
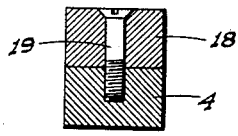
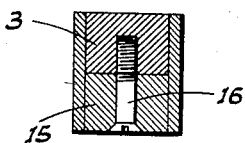
INVENTOR.
C. E. Zumwalt
BY
ATTYS Dec. 30, 1958   C. E. ZUMWALT   2,866,276
CORE DEVICE FOR TEACHING ELECTRICITY AND MAGNETISM
Filed Aug. 12, 1957   6 Sheets-Sheet 3

INVENTOR.
C. E. Zumwalt
BY
ATTYS

Dec. 30, 1958 C. E. ZUMWALT 2,866,276
CORE DEVICE FOR TEACHING ELECTRICITY AND MAGNETISM
Filed Aug. 12, 1957 6 Sheets-Sheet 4

INVENTOR.
C. E. Zumwalt
BY
*[signature]*
ATTYS

Dec. 30, 1958 C. E. ZUMWALT 2,866,276
CORE DEVICE FOR TEACHING ELECTRICITY AND MAGNETISM
Filed Aug. 12, 1957 6 Sheets-Sheet 5

INVENTOR.
C. E. Zumwalt
BY
ATTYS

Dec. 30, 1958　　　C. E. ZUMWALT　　　2,866,276
CORE DEVICE FOR TEACHING ELECTRICITY AND MAGNETISM
Filed Aug. 12, 1957　　　　　　　　　　　　　6 Sheets-Sheet 6

INVENTOR.
C. E. Zumwalt
BY
ATTYS

United States Patent Office 2,866,276
Patented Dec. 30, 1958

2,866,276

CORE DEVICE FOR TEACHING ELECTRICITY AND MAGNETISM

Cletus E. Zumwalt, Modesto, Calif.

Application August 12, 1957, Serial No. 677,493

12 Claims. (Cl. 35—19)

This invention is directed to an electro-mechanical structure; my main object being to provide a structure of this type which is particularly adapted to serve as a teaching aid in the field of magnetism and electricity, whether the instruction given is of the formal classroom type, or for home instruction from prepared lessons and experiments.

Another object of the invention is to provide an educational device consisting of an improved type of electro-mechanical core in which a more satisfactory and economical structure for educational purposes is provided than has heretofore been the case. This is because my new structure is arranged so that it may be assembled in different forms and combinations to enable various principles and applications of various electro-mechanical phenomena to be easily demonstrated and understood by the teacher and pupil, respectively.

This improved arrangement requires a minimum of parts for the multitude of devices which may be assembled from such parts, and which may then be studied, and avoids the large expense which would otherwise be necessary to construct or purchase the equivalent number of individual devices.

It is also an object of the invention to provide an educational device which is designed for ease and economy of manufacture.

Still another object of the invention is to provide a practical, reliable, and durable educational device, and one which will be exceedingly effective for the purpose for which it is designed.

These objects are accomplished by means of such structure and relative arrangement of parts as will fully appear by a perusal of the following specification and claims.

In the drawings:

Fig. 2 is a front elevation of such transformer, as assembled.

Fig. 3 is an end view of the same.

Fig. 4 is a fragmentary cross section on line 4—4 of Fig. 2.

Fig. 5 is a similar view on line 5—5 of Fig. 2.

Figure 1:
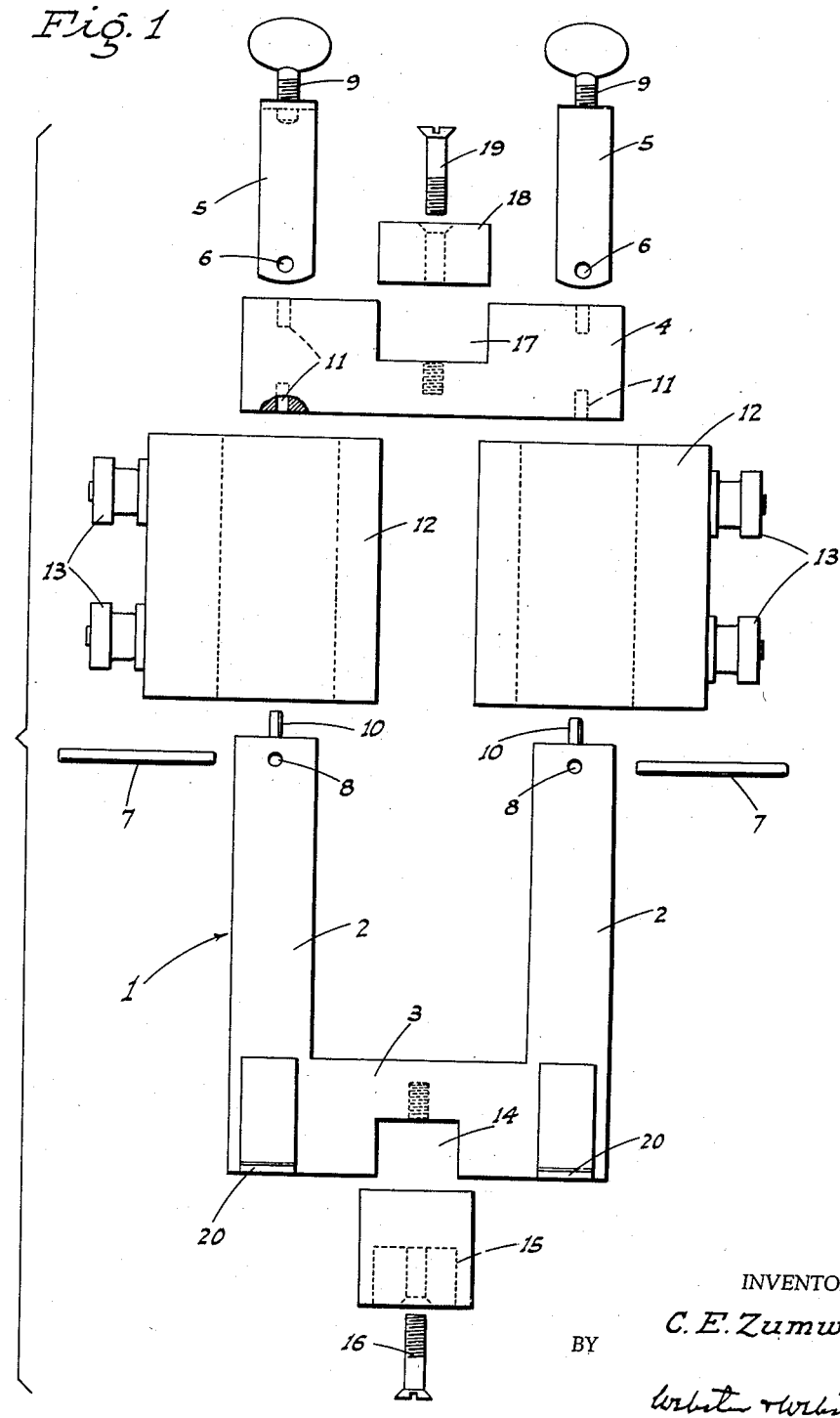
Fig. 1 is an exploded elevation of a simple form of transformer conducted according to my invention, and the parts of which—duplicated at times—form the basis for various forms of the invention, as will be seen hereinafter.

Referring now more particularly to the drawings and to the characters of reference marked thereon, and especially at present to the basic features or parts shown in Fig. 1, the numeral 1 denotes a U-core generally, and which comprises — in integral relation — parallel legs 2 and a bottom end or cross bar 3 of magnetizable material. The core is completed by a separate top end or cross bar 4.

In order to detachably connect bar 4 to legs 2, I provide U-shaped clips 5 to straddle bar 4 and legs 2 from above, and each having holes 6 near its lower end to receive a cross pin 7 removably projecting through a hole 8 in the corresponding leg 2 near its upper end.

A finger screw 9, to engage the top surface of bar 4, is mounted in each clip 5 at the top thereof. To locate the bar 4 relative to the legs, dowel pins 10 are mounted in and project from the upper end of the legs, and engage sockets 11 in the cross bar. Coils 12 having terminal posts 13 on the sides thereof removably fit on legs 2, and are of course placed thereon before the cross bar 4 is mounted in place.

The bottom bar is square-recessed, as at 14, from the lower end up for half its depth and centrally of its ends. A flanged block 15 is provided to fill the recess, and to be secured to the bar by a screw 16. The length of the recess 14 is the same as the width of the bar for the purpose set forth later. A similar recess 17 is formed in the bar 4; a block 18, with a mounting screw 19, being provided to close or fill said recess. Mounting feet 20, to maintain the core in an upright position, project from opposite sides of the core at the lower end thereof.

When the above described parts are properly assembled, the transformer shown in Fig. 2 is provided, and by means of which various fundamental principles of electro-mechanical devices may be readily demonstrated. The recesses 14 and 17, when the blocks 15 and 18 respectively are removed, provide air gaps which increase the reluctance, but when the said blocks are in place the air gap reluctance is practically eliminated. These air gap recesses 14 and 17 are however necessary in order to permit a special assembling of the cores.

If a pair of the assembled units of Fig. 2 are employed in a demonstration, one coil of each unit may be used as a transformer secondary while the other coil forms the primary.

For instructional purposes it is very imperative—in teaching the fundamentals of transformers and various saturating core devices and magnetic amplifiers—that E-core structures be provided. To this end, the units shown in Figs. 6 and 8 are assembled and utilized.

Figure 6:
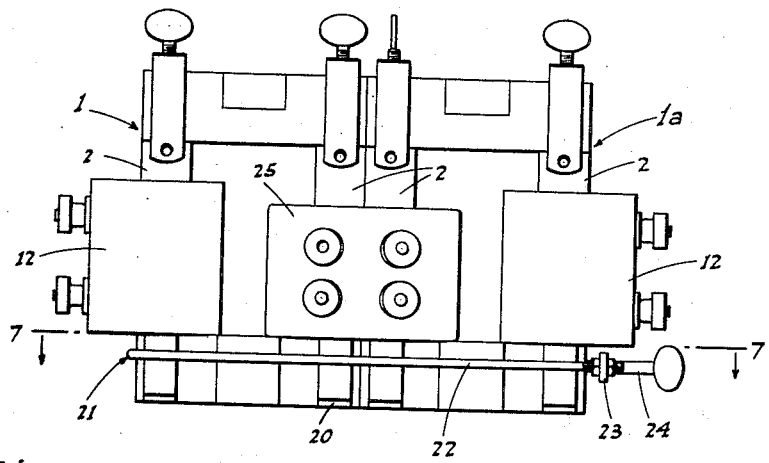
Fig. 6 is an elevation of a device for the purpose formed by another core and coil arrangement.
Figure 7:
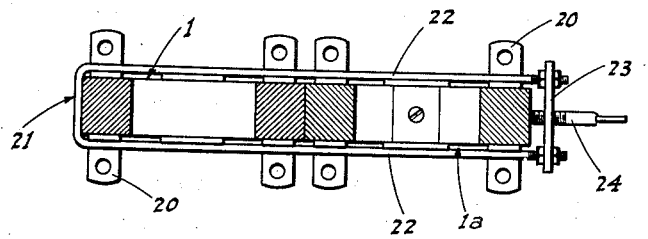
Fig. 7 is a sectional plan on line 7—7 of Fig. 6.

The unit shown in Fig. 6 comprises a pair of the complete U-cores disposed in close end to end relation, as shown. These cores are detachably but rigidly connected together both mechanically and magnetically by an elongated U-clamp 21, the legs 22 of which extend along the bottom portion of the cores, and at their outer ends are connected by a cross bar 23 in which a thumb screw 24, to engage the end of one core, is mounted, as shown particularly in Fig. 7.

A coil 12 is mounted on the outermost leg 2 of each core 1, while the two adjacent legs of the cores are surrounded by a center coil 25 of a four-terminal type. This center coil is arranged to form the secondary of a step-down transformer, while the coils 12 when connected together form the primary of the transformer.

Figure 8:
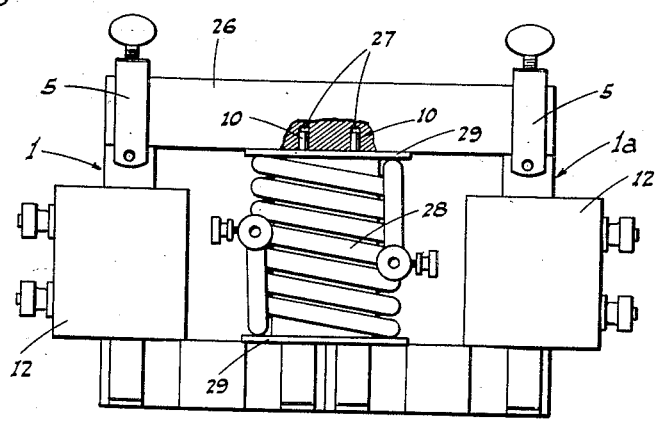
Fig. 8 is an elevation of a further core and coil arrangement.
Figure 9:
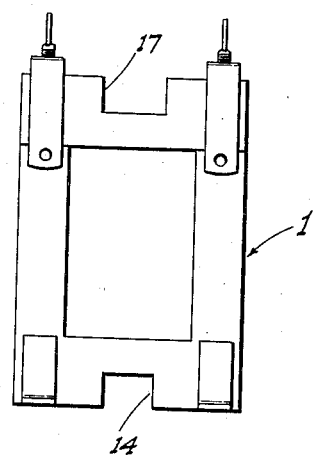
Figs. 9 and 10 are elevations of a pair of cores arranged for crossing cooperation with each other.
Figure 10:
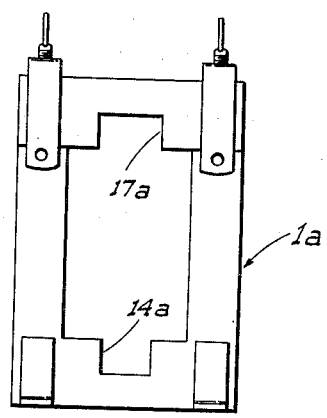

A preferred form of E-core structure is shown in Fig. 8. In this structure the lower portions of a pair of U-cores are retained, and said cores are disposed in close end to end alinement as in the type of Fig. 6. The top cross bars 4 of said cores are removed however and replaced by a single elongated top bar 26 which extends from end to end of both cores over the same.

At the ends of bar 26, a pair of the retaining clips 5 is used to detachably hold the bar in place and thus tie the cores together. The dowel pins 10 of the adjacent legs 2 of the cores engage sockets 27 in the bar 26 to stabilize said legs with relation to the top bar; it being understood that the bar also has sockets adjacent its ends to receive the dowel pins of the outermost legs.

Coils 12 are mounted on the outermost legs 2, as in the structure of Fig. 6, while a center coil 28 of a special type, or the type used in Fig. 6, is mounted on and surrounds the adjacent pair of legs. Collars 29 above and below coil 28 closely embrace the adjacent pair of legs 2 and prevent any tendency of the cores to separate at the bottom. This avoids the necessity of using the clamp 21, which however may be employed if desired. The cores, by any of the above described arrangements, may thus be detachably secured together in a mechanically and magnetically efficient manner.

A multitude of current and voltage combinations can be produced and demonstrated by the arrangement shown in Figs. 9–12.

Figure 11:
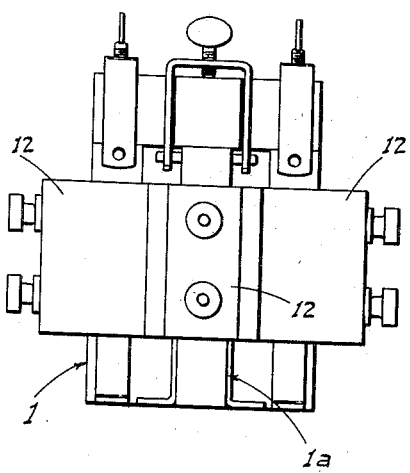
Fig. 11 is an elevation of a complete transformer produced by combining the cores of Figs. 9 and 10 and mounting the necessary coils thereon.
Figure 12:
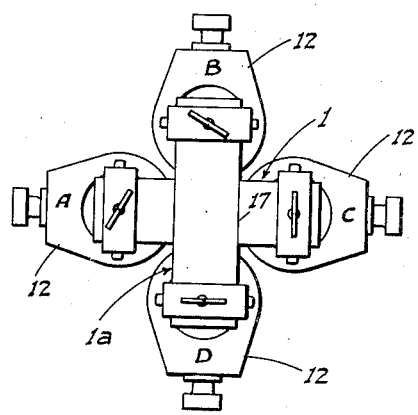
Fig. 12 is a top plan view of such transformer.

To provide the crossed core leg structure shown in Figs. 11 and 12, one of the cores 1—with the air gap closing blocks removed—is employed, together with a similar core 1a, in which the air gap recesses 14a and 17 are inverted, and also left open.

This inversion of the recesses enables the cores to be mounted in crossing relation with each other, as particularly shown in Fig. 12, and which enables a core 12 to be mounted on each leg of the two cores; the various legs being then disposed in evenly spaced and right angle relation to each other, as shown. These cores are here designated as A, B, C, and D, reading clockwise about the unit.

By way of illustration I outline below certain uses of the core and coil arrangement of Figs. 11 and 12 as follows:

(1) Assuming that all four coils 12 are alike, then if coils A and B are connected in parallel to a source of electrical power so as to produce like polarities, then coils C and D if connected in series aiding will (as secondaries) produce substantially twice or double the voltage of the applied input.

(2) If any one of the four coils, as for instance coil A, is used as a primary of the transformer, then many output (secondary) voltages may be obtained by suitable connections of the remaining coils. This will depend upon whether two or all three of these coils are connected together as a secondary of the transformer, and also upon the manner in which they are connected together. For example, said coils may be connected in series, in parallel, or in a series-parallel arrangement in various combinations to produce a multitude of secondary voltages.

(3) If any three coils of this transformer should be connected together to form the primary, then a multitude of secondary current and voltage outputs may be obtained from the single remaining coil as a secondary. This is because of the many coil combinations possible in the various manners in which said three coils may be connected together as the primary winding of the transformer.

(4) Other additional voltages and current combinations may be obtained from this transformer, or as for example when coils A and B are used in combination as the primary winding, and coils C and D are combined in various ways as the transformer secondary.

Figure 13:
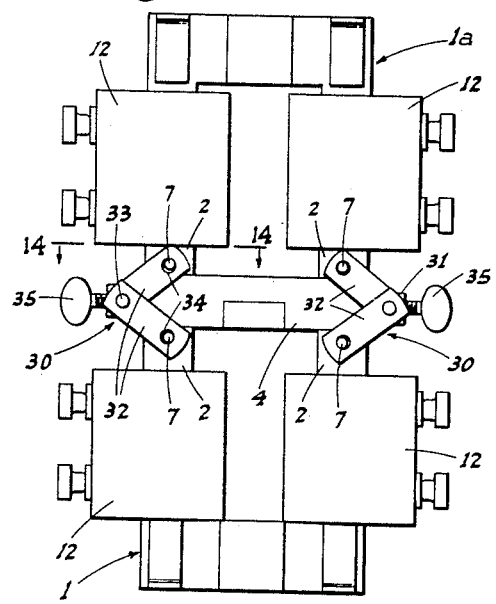
Fig. 13 is an elevation of a modified core and coil arrangement.

In Fig. 13 an E-core transformer is formed in a different manner from what is shown in Figs. 6 and 8. In this arrangement, one U-core 1 and one U-core 1a, with the top cross bar 4 of only one of said cores, are used; the cores being disposed in opposed or inverted relation to each other so that the legs 2 of both cores are longitudinally alined, as shown. To secure the cores together in such opposed relationship, a pair of compound clamps, indicated generally at 30, and which cooperate with the leg-mounted cross pins 7 of the cores, are employed.

Each such clamp comprises a cross block 31 with a pair of links 32 on each side pivoted at one end in common on the block, as at 33. The links adjacent their outer ends have holes 34 therethrough to engage over the corresponding pins 7; a thumb screw 35 being mounted in the block 31 to engage the cross bar 4, and which when tightened down causes the opposed legs 2 of the cores to be pulled toward each other and thus clamped against the cross bar. The two cores and the cross bar are thus securely connected together both mechanically and electrically so that the entire transformer-core cross section will have substantially uniform reluctance throughout. Coils 12 are mounted on the different legs 2; this being of course done before the cores are assembled.

Figure 15:
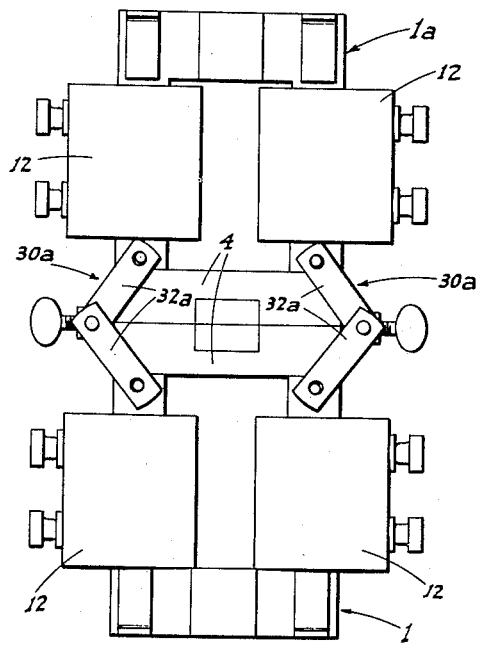
Figs. 15–19 are elevations of further modified core and coil arrangements.

In Fig. 15, a similar E-core transformer is shown, except that both top cross bars 4 of the two cores 1 and 1a are used in contacting relationship; thus providing a larger central core cross section than is the case with the arrangement of Fig. 13. Coils 12 are mounted in the core legs 2, as before.

The two complete cores 1 and 1a are secured together by compound clamps 30a of the same type as clamps 30, except that the links 32a thereof are longer.

Figure 16:
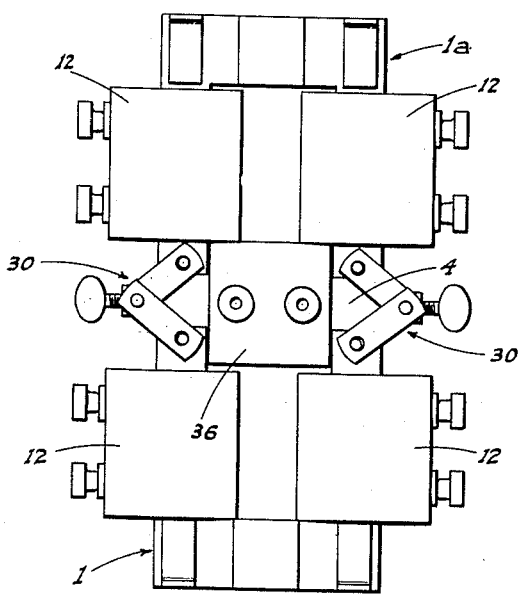
Figure 14:
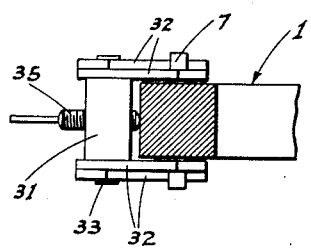
Fig. 14 is a fragmentary sectional plan on line 14—14 of Fig. 13.

The structure of Fig. 16 is identical with that of Fig. 13, but an additional coil 36 is mounted on the central core bar 4. In this arrangement, the coil 36 may be used as the primary winding of the transformer, while the coils 12 may be used in a multitude of combinations as the primary. It is equally true that the center coil 36 may be used as the secondary winding of the transformer, while the various coils 12 may be used in a multitude of combinations as the primary.

On the other hand, this core and coil arrangement and combination may be used as a saturable reactor or as a magnetic amplifier. In this case, coil 36 could be used for the signal pick-up or unidirectional current coil, while the coils 12 may be connected to a group of independent circuits that could be controlled simultaneously.

Conversely, if the lower pair of coils 12 are connected to an alternating current, coil 36 will have a voltage induced in it by induction or transformer action, and because of this induced voltage a current will flow in said coil 36 if short-circuited or connected to a load.

It may be noted that although said lower coils 12 are connected to a source of alternating current, there can be no current flow in the upper pair of coils 12 until coil 36 is short circuited or at least connected to some sort of load. However, when coil 36 is short circuited or connected to a load, then an induced voltage will be produced in said upper coils 12 if they are short circuited or connected to a load.

Figure 17:
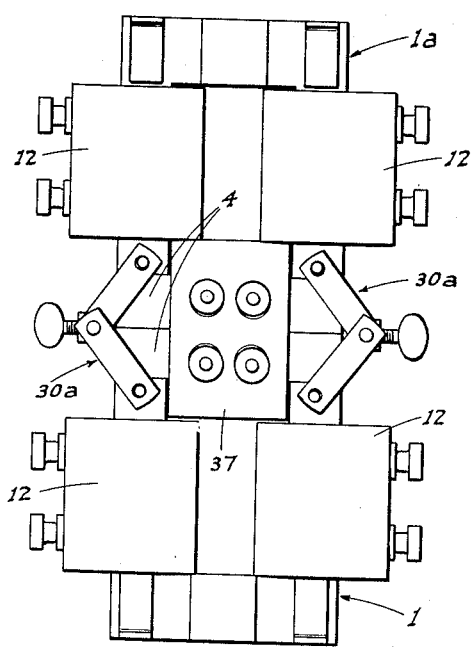

The structure of Fig. 17 is identical with that of Fig. 15, but a four-terminal central coil 37 embraces the double-width central core bar unit of the structure. If the lower pair of coils 12 are connected together to form the primary of this transformer and coil 37 is the secondary, then in this instance a secondary voltage would be induced in coil 37 when and if an alternating current is flowing through said lower coils 12. The induced voltage in coil 37 would cause a current to flow therein if short circuited or loaded. In this instance a current would flow in the upper pair of coils 12 when a current is flowing in coil 37.

Figure 18:
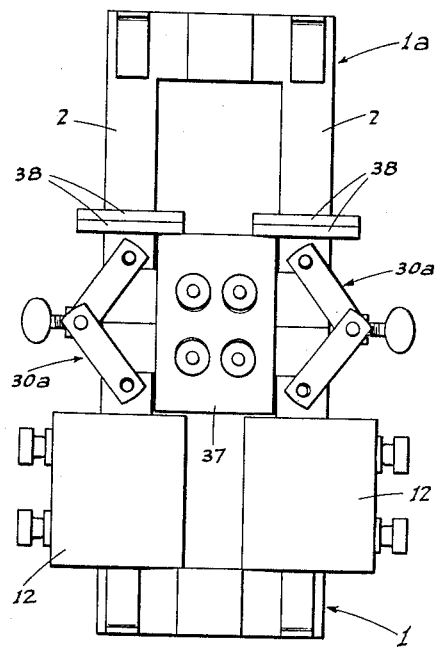

The same core structure and arrangement is shown in Fig. 18, and the lower coils 12 and the central coil 37 are utilized. However, the coils 12 are omitted from the upper portion of the core, above the coil 37, and in their place a pair of contacting metal washers 38 are mounted on each corresponding upper core leg 2. When said coils 12 are energized by an alternating current, then said washers 38 will be repelled when—and only when—the central coil is short circuited or loaded. This of course makes a very effective demonstration of Lenz's law.

Figure 19:
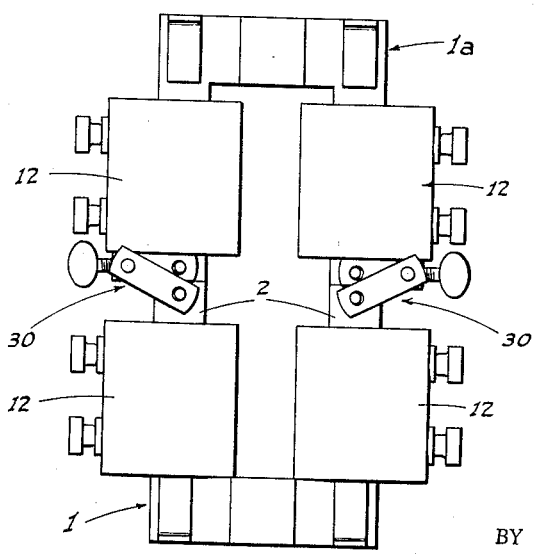

In the structure shown in Fig. 19, I also use a pair of cores 1 and 1a disposed in inverted relation to each other, but with the top cross bars 4 thereof omitted. The two cores when assembled with the ends of the legs 2 thereof in contact with each other therefore form an elongated O-shaped core, as shown. These two cores 1 and 1a are connected together both mechanically and electrically by a pair of the compound clamps 30. Any desired number of coils 12, here shown as four, may be mounted on the legs 2 of the cores 1 and 1a, and which coils may be connected together in a multitude of combinations to give various currents and voltages when operated as a transformer. This arrangement may also be used in a multitude of coil combinations as a variable reactor whereby many degrees or amounts of reactance can be obtained, depending upon how the coils are connected.

From the above description it will be seen that a set of parts, needed to erect or assemble any one at a time of the devices shown, consists of one each of the complete U-cores 1 and 1a, including a set of clips 5, one long top bar 26, four coils 12, one each of the coils 25, 28, 36, and 37, or their equivalent, a set of washers 38, a set of the clamps 30 and 30a, and of course a supply of wiring for coil connection purposes.

From the foregoing description it will be readily seen that there has been produced such a device as will substantially appear by a perusal of the following specification and claims.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. An educational electrical training aid in the form of an electro-magnetic device comprising a U-core of magnetizable material and having spaced parallel legs initially free at one end to receive core energizing coils thereon from said one end, a magnetizable cross bar extending between and bearing on the legs at said one end thereof, and means detachably securing the legs and cross bar together both mechanically and magnetically, said securing means, for each end of the cross bar, comprising a clip to straddle the bar and the adjacent portion of the leg, a cross pin removably mounted in the leg and projecting through holes in the clip, and a clamping screw mounted in the clip and engaging the face of the bar opposite the leg.

2. An educational electrical training aid in the form of an electro-magnetic device comprising a U-core of magnetizable material, and including a pair of spaced parallel legs integrally connected at one end by a core end and at the other end by a removable cross bar, core energizing coils on said legs, the core end and bar being each notched to form an air gap therein intermediate the legs, and separately removable blocks filling the gaps.

3. An educational electrical training aid in the form of an electro-magnetic device comprising a U-core of magnetizable material and including a pair of spaced parallel legs integrally connected at one end by a core end and at the other end by a removable cross bar, core energizing coils on said legs, the core end and bar each having an air gap formed therein intermediate the legs, and separately removable blocks filling the gaps, the core end and cross bar being rectangular in cross section, and the air gaps being rectangular in shape, the air gap in the core end having a width equal to that of said core end and a depth equal to half the thickness of the core end and the air gap in the bar having a similar relationship to the bar whereby a pair of cores having relatively inverted air gaps may be connected together in crossing relation upon removal of the gap filling blocks.

4. An educational electrical training aid in the form of an electro-magnetic device comprising a pair of U-cores each including a pair of spaced parallel legs, a core end integrally connecting the legs at one end and a cross bar connecting the legs at their other end, the cores being disposed in end to end alinement with adjacent legs in contact, core energizing coils on the outermost legs, a similar coil embracing both adjacent contacting legs, and detachable means to connect both cores mechanically and magnetically.

5. A device, as in claim 4, in which said detachable means comprises an elongated U-shaped clamping member straddling and extending along both core ends and engaging the outer end of one core end, a cross bar on the member adjacent but beyond the outer end of the other core end, and a clamping screw threaded through said bar and engaging said other core end.

6. An educational electrical training aid in the form of an electro-magnetic device comprising a pair of U-cores each including a pair of spaced parallel legs, a core end integrally connecting the legs at one end, the other end of the legs being initially free, the cores being disposed in end to end alinement with adjacent legs in contact, a coil embracing both contacting legs, a coil embracing each of the other legs, a bar extending from end to end of the connected cores in engagement with the free ends of the legs, and means detachably securing the bar to the outermost legs both mechanically and magnetically.

7. A device, as in claim 6, with dowels projecting from the free ends of the adjacent legs; the bar having locating sockets into which the dowels extend.

8. An educational electrical training aid in the form of an electro-magnetic device comprising a pair of U-cores each including a pair of spaced parallel legs, a core end integrally connecting the legs at one end, the legs being initially free at the other end and the cores being disposed in inverted relation with the free ends of the legs in facing relation, core energizing coils on the legs, a cross bar extending between and maintaining said free ends of the legs separated, and clamping means at each end of the bar to secure said bar and the adjacent legs together both mechanically and magnetically.

9. A device, as in claim 8, in which the clamping means comprises a cross block, a pair of links pivoted at one end in common on the block on each end thereof, pins removably mounted in the legs adjacent said free end thereof and projecting through holes in the links, and a clamping screw threaded through the block and engaging the end of the cross bar.

10. A device, as in claim 8, with a coil on said cross bar.

11. An educational electrical training aid in the form of an electro-magnetic device comprising a pair of U-cores each including a pair of spaced parallel legs, a core end integrally connecting the legs at one end, the legs being initially free at the other end and the cores being disposed in inverted relation with the free ends of the legs in facing relation, a bar extending between the legs and engaging the same at said free ends thereof, means detachably securing the bar and legs together mechanically and magnetically, a coil embracing said bar, coils on the legs of one core, and metal washers on the legs of the other core engaging the first named coil.

12. An educational electrical training aid in the form of an electro-magnetic device comprising a U-core of magnetizable material and including a pair of spaced parallel legs integrally connected at one end by a core end, core energizing coils on the legs, the core end being provided with a relatively large notch to form an air gap while maintaining the core end rigid from end to end, and a block removably secured to the core end and filling the gap.

References Cited in the file of this patent

UNITED STATES PATENTS

| | | |
|---|---|---|
| 400,972 | Thompson | Apr. 9, 1889 |
| 1,698,634 | Johannesen | Jan. 8, 1929 |
| 1,803,353 | Porter | May 5, 1931 |
| 2,374,449 | Mulcahy | Apr. 24, 1945 |
| 2,617,092 | Schlawin | Nov. 4, 1952 |

FOREIGN PATENTS

| | | |
|---|---|---|
| 621,970 | France | Feb. 19, 1927 |
| 344,961 | Great Britain | Mar. 19, 1931 |